United States Patent [19]

Witkin et al.

[11] Patent Number: 4,745,550
[45] Date of Patent: May 17, 1988

[54] PROCESSING OF ORIENTED PATTERNS

[75] Inventors: Andrew P. Witkin, Half Moon Bay; Michael H. Kass, San Francisco, both of Calif.

[73] Assignee: Schlumberger Technology Corporation, Palo Alto, Calif.

[21] Appl. No.: 766,639

[22] Filed: Aug. 16, 1985

[51] Int. Cl.$^4$ .......................... G01V 1/00; G06K 9/46
[52] U.S. Cl. .................... 364/422; 364/421; 364/400; 382/16; 382/25
[58] Field of Search ............... 364/421, 420, 400, 422; 382/16, 25

[56] References Cited

U.S. PATENT DOCUMENTS 3,976,384 8/1976 Matthews et al. .................. 356/437

*Primary Examiner*—Jerry Smith
*Assistant Examiner*—Charles B. Meyer
*Attorney, Agent, or Firm*—Theodore S. Park; Ivan S. Kavrukov

[57] ABSTRACT

Disclosed are a method and a system for processing patterns such as oriented patterns, to derive constituents which are more useful than the original patterns. For example, an oriented pattern such as a seismic section can be decomposed into a flow field, which is an estimate of a moving accretion boundary which formed the subsurface layers, and a residual pattern, which is an estimate of layer properties, such as acoustic velocity. Similarly, an oriented pattern such as a chart displaying changes in borehole resistivity with depth along its vertical direction and changes in resistivity with angle around the borehole along its horizontal dimension, can be decomposed into a flow field and a residual pattern, where the flow field is an estimate of a moving accretion boundary and the residual pattern is an estimate of resistivity changes with depth and angle independent of the accretion boundary. The flow field can be mapped onto regular, e.g. orthogonal or polar, coordinates to thereby straighten the original pattern into a deformed or residual pattern which is more useful with respect to visualizing or further processing a parameter of interest than the original pattern.

38 Claims, 5 Drawing Sheets

SIMPLIFIED ORIENTED PATTERN

SIMPLIFIED TRANSFORMED (RESIDUAL) PATTERN $a = C(x, y-1)$
$b = C(x-1, y)$
$c = (x, y)$
$d = C(x-1, y)$
$e = C(x, y-1)$ $c_x = (d-b)/2$
$c_y = (a-e)/2$

BOREHOLE RESISTIVITY PATTERN

BOREHOLE RESISTIVITY PATTERN (WITH FIELD FLOW LINES INDICATED)

RESIDUAL PATTERN

TRANSFORMED PATTERN

WOOD GRAIN ORIENTED PATTERN

LOCALLY ESTIMATED FLOW PATTERN

WOOD GRAIN ORIENTED PATTERN WITH FIELD LINES SUPERIMPOSED

DEFORMED (RESIDUAL) PATTERN

PROCESSING OF ORIENTED PATTERNS

BACKGROUND AND SUMMARY OF THE INVENTION

The invention is in the field of systems and methods for processing patterns, such as oriented patterns, to derive constituents which are more useful than the original patterns, and to deform the patterns into more useful forms. For example, in accordance with the invention an oriented pattern such as a seismic section can be decomposed into a flow field, which can be thought of as an estimate of a moving accretion boundary which formed the subsurface layers, and a residual pattern, which can be thought of as defining layer properties, such as acoustic velocity. The flow field can then be used to deform the pattern such that the parameter of interest in the pattern can be viewed and/or further processed more conveniently. For example, the seismic section can be deformed such that all of the subsurface horizons are along one regular (e.g., orthogonal) coordinate, and can thus all be horizontal. This can immensely simplify further processing because, for example, the many seismic horizons in a typical section need not be traced along their respective typically wavy lines to find subsurface features of interest, such as faults and discontinuities, but along the straight lines of one of the coordinates of the pattern deformed in accordance with the invention.

Machine perception of patterns is a problem common to many fields, and a need has long existed to transform patterns in a way which emphasizes or extracts features which are particularly useful in some overall process. One relatively simple example is in camera auto-focusing, where the useful feature of the image pattern on the focusing screen is its degree of sharpness as the focusing ring turns, as opposed to features such as what objects are in the frame, or what is the overall exposure. As another relatively simple example, an intrinsic property such as the shape of a workpiece can be the feature of interest where it is desirable to have a robot arm recognize as equivalent all workpieces which are similarly shaped, regardless of how they differ in other pattern features, such as color, texture, illumination, etc. While these examples typify a class of problems in machine perception of images, the invention here has a different emphasis.

A common problem in computational vision is how to decompose a pattern into intrinsic patterns (e.g., depth, reflectance and illuminance) which can be more useful than image intensity in some overall process because they can describe more basic and more independent constituents of the pattern forming process. Thus, for example, if a computational vision system separates shape from illumination, it can recognize shape regardless of changing illumination. The advantages of decomposing a pattern into more-or-less independent constituents in order to enhance its usefulness in some process can extend to processes which make use of the way in which the object giving rise to the pattern originates. For example, a system which could decompose a pattern which corresponds to the image of a bent rod into two constituents, a straight rod and a bending transformation, can find the similarity between a bent rod and one which has not been bent, or some other solid bent the same way.

One class of patterns which can be of significant interest in fields such as exploration for subsurface resources, e.g., hydrocarbons and minerals, is oriented patterns, notably those produced by processes such as propagation, accretion, or deformation. An example of a pattern produced by propagation is that of the deposits left by the movement of a prehistoric glacier; an example for accretion is the pattern of the sediments at the bottom of a prehistoric body of water; and an example of deformation is the pattern of subsurface strata deformed by a tectonic movement. If such patterns can be effectively decomposed into a constituent indicative of what was propagating or accreting or deforming, and a constituent indicative of which way and how much, then the constituents can benefit an overall process of exploration for, and exploitation of, underground resources, or some other overall process, more than the original pattern. More precisely, the desired decomposition in accordance with the invention can be into an estimate everywhere of the direction and magnitude of the anisotropy of the pattern (or of the "flow field" of the pattern), and of the residual pattern which is significantly independent of the flow field. For example:

(a) a typical oriented pattern created by propagation is the streaked trail left by a paint brush; the flow field of that pattern can describe the trajectory of the brush, which can be useful in a process pertaining to trajectory control, and the residual pattern then depends on the distribution of paint on the brush, which can be useful in a process pertaining to supplying paint to the brush;

(b) a typical pattern created by accretion is a laminar structure, such as wood grain; here the flow field can define isochrones (the moving accretion boundary) and the residual pattern can give the change in color or brightness of the accreting material over time; and (c) if an isotropic body is deformed, the flow field principally describes the bending and stretching it has undergone, while the residual pattern describes the undeformed body.

As another example, which can be of a more immediate interest in the use of this invention, a seismic section can be processed in accordance with the invention as an oriented pattern in which the flow field can define the subsurface horizons, and the residual pattern can define the change in acoustic velocity across the horizons. Yet another example can be the pattern derived from a borehole tool (well logging tool) which can measure subsurface resistivity as a function of both borehole depth and angle around the borehole wall, and can give an output in the form of a column charting resistivity changes with depth along the long, vertical dimension and with angle in the short, horizontal dimension. This output can be processed as an oriented pattern such that, for example, the subsurface layers which dip in nature are in fact displayed as horizontal bands, with appropriate correction for the relative positions of display points. The changes in properties with depth can then be simply traced along the vertical dimension, without having to account for dip in the tracing process. Similarly, changes with angle can be simply traced along straight horizontal lines.

In all these examples, separate descriptions of the flow field and the residual pattern can be useful because they describe different processes. The path of propagation of a physical process can be controlled by mechanisms very different from those controlling the nature of the material left behind. The mechanism which controls the shape of an accretion boundary can be different from that creating the layer material. The forces which deform a rod can be different from those which created the rod in the first place. If these properties of patterns can be separated, then the isolated and hence simplified features can be more meaningful or useful than without the separation.

While various proposals have been made concerning the machine perception of oriented patterns in various fields, it is believed that the complexity of the analysis has proved to be a substantial impediment to achieving useful results. Accordingly, one object of the invention pertains to processing oriented patterns in a particularly efficacious way to find the flow field. Another pertains to a significant departure from known prior proposals—the use, in accordance with the invention, of the flow field to define the residual pattern in a natural coordinate system derived from the flow field, and thus provide significant and unexpected benefits in processes making use of the flow field and/or the residual pattern. Yet another pertains to the processing of the residual pattern along one or more coordinates of the natural coordinate system derived from the flow field.

Stated differently, in accordance with the invention, an oriented pattern can be processed to find its flow field and if desired to define it in terms, for example, of a grid of flow lines and lines locally transverse to the flow lines. This grid, which typically is made up of wavy lines, can then be mapped into regular coordinates, for example orthogonal coordinates, to "straighten" the grid lines and thereby deform the pattern into a residual pattern, i.e., the constituent of the original pattern which is substantially independent of the flow field which caused the distribution of the parameter of interest in the original pattern. Because the grid lines are based on an estimate of the flow field, they can be considered as a more natural coordinate system than the one in which the pattern is originally represented, and the regular coordinates into which the grid lines are mapped to transform the original pattern into the deformed pattern (also called the residual pattern or constituent), they too can be considered as more natural for the parameter of interest.

In accordance with one example of the invention, an oriented pattern can be processed first to estimate its flow field, for example by finding local estimates of flow directions in the pattern and using them to find an estimate of the overall flow field. A flow field grid can be constructed on the basis of the estimated flow field, and can be considered as a natural coordinate system for the original oriented pattern. This grid of typically wavy lines can then be mapped into regular (e.g., orthogonal or polar) coordinates, which also can be viewed as natural coordinates for the parameter of interest. Transforming the original pattern into those regular "flow" (or natural) coordinates, can straighten the original pattern, removing the effects of changing orientation and making it a more useful residual (or deformed) pattern.

Specifically, in one exemplary and nonlimiting embodiment of the invention, a pattern after initial filtering is processed to measure the gradient of a parameter such as image intensity (or a subsurface property, such as resistivity) at each point (or elemental area or volume) in the pattern. The gradient angle is then doubled, to map directions differing by 180° into a single direction, and the transformed gradient vectors are summed over a weighted neighborhood around the respective point in the pattern. The angle of the summed vector is halved, to undo the previous transformation. This gives an estimate for the direction of greatest variance in the parameter of interest, which is then rotated by 90° to yield the local flow direction. In practice, this can be done by a machine-implemented process equivalent to convolving the pattern $I(x,y)$ with an isotropic bandpass filter $H(x,y)$ to produce a convolved pattern $C(x,y)$ in which the filter is applied to each of a number of selected elements of the pattern. The convolved pattern $C(x,y)$ is localled differentiated by finite differences to find the local change in a selected parameter of the pattern in the x-direction ($C_x$) and in the y-direction ($C_y$) at each of a number of selected locations $(x,y)$ in the pattern. These can be used to derive local measures $J_1(x,y)=2C_x(x,y)C_y(x,y)$ and $J_2(x,y)=C_x^2(x,y)-C_y^2(x,y)$, which are in turn convolved with a local weighting function $W(x,y)$ to derive respective local measures $J_1^*(x,y)$ and $J_2^*(x,y)$. The local angle phi of the direction of greatest change of a selected parameter of the pattern can then be derived in accordance with the relationship $$\phi(x,y) \approx \tan^{-1}(J_1^*(x,y)/J_2^*(x,y))/2$$

In addition to finding the local direction of anisotropy (the local estimate of flow direction) by such local estimates, it can be important to find how strong the anisotropy is at each point of interest in the pattern. If the gradient vectors around a particular point on the pattern are not very different, then the orientation of the slight anisotropy at that point may not be very significant. Conversely, if the gradient is much stronger in one direction, this can be quite meaningful. For this reason, a measure called local coherence can be found, in accordance with the invention, of how significant the distribution of gradient vectors is at each point (or at least each point of interest) in the pattern. If the gradient vectors are close to uniform around a pattern point, the local coherent measure would be close to zero; if the only gradient vector having a significant magnitude points in a given direction, then the coherence measure is close to one; in between, the coherence measure increases with the peak of gradient vectors getting narrower. In order to estimate the reliability of the local estimate of flow direction in accordance with a particular embodiment of the invention as a machine-implemented process, a local coherence $X(x,y)$ can be found by finding a third local measure $J_3(x,y)=[C_x^2(x,y)+C_y^2(x,y)]^{\frac{1}{2}}$ and convolving it with the same local weighting function $W(x,y)$ to derive a third local measure $J_3^*(x,y)$. The local coherence $X(x,y)$ of the local flow directions can then be found in accordance with the relationship $$X(x,y)=(J_1^*(x,y)^2+J_2^*(x,y)^2)^{\frac{1}{2}}/J_3^*(x,y)$$

The estimates of local flow directions and of local flow coherence can, but need not, be displayed.

The flow field can be thought of as an abstraction of the anisotropy of the pattern, which may not be apparent from observing or otherwise processing the original pattern. For example, patterns composed of bands, irregular streaks, and dot pairs can have the same flow field. In addition to finding the flow field, it may be useful to find the underlying pattern constituent which is independent of the changing direction of anisotropy in the original pattern. Finding the underlying, residual pattern can reveal, for example, that two very different flow fields are defined by the same kinds of bands or streaks in the original pattern.

A powerful way to remove the effect of changing orientation of the anisotropy in the original pattern in accordance with the invention, is to literally straighten the pattern, by subjecting it to a transformation which maps the typically wavy flow field lines into regular coordinates, e.g., straight, parallel lines in a canonical, e.g., horizontal, orientation. In this example, this can be thought of as a process which starts with an original pattern which shows how a residual pattern looks after it is bent, and gives a transformed pattern which shows how the residual pattern looked before it was bent to form the original pattern. While for many overall processes it may not be necessary to explicitly represent or show the residual pattern in the regular coordinates into which the flow field grid can be mapped, the ability in accordance with the invention to estimate the flow field and use coordinates based on it can be highly useful in itself toward the goal of decomposing the original pattern into constituents which are simpler than the original pattern and are more closely tied to independent parts of the physical processes likely to have led to the creation of the original pattern.

In a particular example of practicing this aspect of the invention as a machine-implemented process, a location (e.g., element or area or pixel) of the original pattern is selected, and the desired grid lines are traced by taking steps of respective fixed arc-length along flow lines which are locally along the local flow directions and along transverse lines which are locally across the local flow directions. This typically gives a grid of wavy lines which are transverse, e.g., perpendicular, to each other where they intersect.

In order to "straighten" the pattern, i.e., deform it into a pattern which is represented in desired regular coordinates so as to bring out the residual pattern, free of the estimated influence of the flow field, the typically wavy grid lines are mapped onto a regular coordinate system. In the example of a regular coordinate system which is orthogonal, each typically wavy grid line becomes a straight line, and the pattern elements which were on the wavy line are now on a straight line. Bilinear interpolation can be used to interpolate the wavy grid lines from the nearby local estimates of flow direction, and to interpolate the values of elements (pixels) of the deformed pattern (the residual pattern) from nearby elements of the original pattern.

The regular coordinates are particularly useful for estimating changes in a selected parameter of the deformed pattern in a direction along or across the flow field, which is often of primary interest. While in the original pattern wavy lines have to be followed for this purpose, which can present difficulties in a machine-impleneted process for pattern processing, in a residual (deformed) pattern derived in accordance with the invention this is not the case, because in the case of using orthogonal regular coordinates, at each point the flow direction is a straight line and the direction across the flow also is a straight line. If the regular coordinate system into which the original pattern is transformed to derive the residual pattern is not orthogonal, then the directions with and across the flow are still regular, e.g., along an arc in the case of the theta coordinate in a polar (r, theta) coordinate system.

One relatively simple example of a benefit of the invention is in edge detection. In an original pattern in which the flow field is not apparent, it can be difficult to select a meaningful direction in which to look for edges and, additionally, it can be difficult to follow or maintain a meaningful direction which started out well. However, this is immensely simplified when, in accordance with the invention, a direction along or across the regularized flow field coordinates can be selected and easily followed. In the example of a seismic section, a machine process for detecting acoustic velocity transitions between subsurface layers can be immensely simplified and speeded up if the section can be represented in orthogonal flow field coordinates, because then the search can be in straight lines perpendicular to the layer boundaries in the new, regularized flow field coordinate system of the residual (deformed or transformed) pattern. The search for anomalies can be similarly enhanced. For example a simple search in straight lines along (or parallel to) the other coordinate in the new coordinate system (along the flow direction) can locate anomalies such as missing sections or faults in the subsurface formations. Geological models can be fitted to the pattern which has been "straightened" by using regularized flow field coordinates in accordance with the invention much more easily, and can be manipulated in that coordinate system much more easily than in the coordinate system of the original pattern, to thereby speed up the exploration of the subsurface formations for underground resources.

Another example of the invention is in characterizing subsurface structures in terms of depositional history. For example, a well logging tool designated by the mark MST, carries a number of transducers which measure subsurface resistivity along segments of a narrow fan which can have its apex at the tool and spread in a plane perpendicular to the long axis of the tool. The processed output of the tool can be similar in appearance to the image of a core sample in the logged subsurface formations. If the formations are dipping, the tool output would show a column of short lines (straight or wavy) which are at an angle to the horizontal corresponding to the dip angle in the relevant vertical plane. The short lines can be parallel to each other if the dip is constant, but at an angle to each other if the dip changes with depth in the borehole. If in accordance with the invention the tool output is deformed to a coordinate system in which both the dip lines and the subsurface layers (or beds) are all horizontal, then parameters such as resistivity per subsurface bed, changed in resistivity along a direction perpendicular to the direction in which the layers were deposited in the first place, and other parameters pertaining to the depositional history, or the tectonic movement history, of the subsurface layers, can be much more easily estimated and further processed by using the new coordinate system, and therefore can be much more useful in the exploration for, and exploitation of, underground resources. In different fields, the invention can be useful in processing other oriented patterns, such as interference patterns which can be decomposed into a flow field and a residual pattern in an effort to determine what caused the interference pattern. While the invention is described as applied to two-dimensional patterns, its principles apply to three-dimensional patterns as well, which can be thought of as made up of a stack of two-dimensional patterns. As yet another nonlimiting example of the invention, decomposing a pattern which has resulted from a deformation of an isotropic body into a flow field and a residual pattern in accordance with the invention, can allow finding a physical deformation which requires least energy, or finding other physical parameters useful in subsequent processes. Other aspects of the invention will become apparent from the detailed description below.

DETAILED DESCRIPTION

Figure 1:
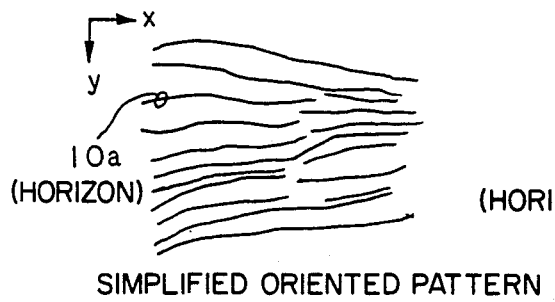
FIG. 1 shows an oriented pattern in the form of a simplified illustration of a seismic section.
Figure 2:
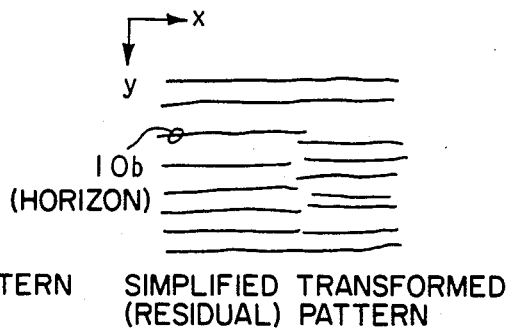
FIG. 2 illustrates a transformed pattern derived by deforming the pattern of FIG. 1 to represent it in its flow field coordinates.
Figure 5:
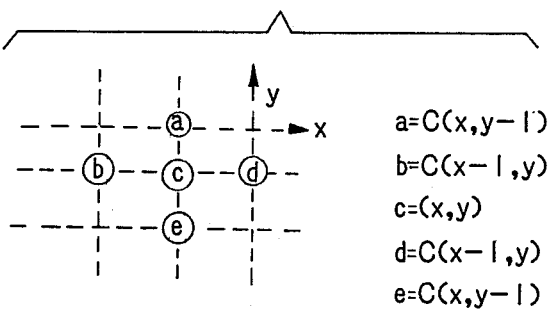
FIG. 5 illustrates an efficient way of approximating gradient vector components.

In one example of the invention an oriented pattern is transformed, on the basis of coordinates estimated from its flow field, into a deformed pattern to thereby produce a residual pattern which is more useful in some overall process than the original oriented pattern. For example, referring to FIGS. 1 and 2, the simplified seismic section illustrated in FIG. 1 is transformed into a residual pattern such as in FIG. 2, where the seismic horizons are along or parallel to the x-coordinate and the acoustic velocity changes can be followed by moving along or parallel to the y-coordinate. Among the important advantages of a pattern such as in FIG. 2 is the ease of using a machine-implemented process to follow horizons in further processing of the seismic section as compared with using such a process to follow horizons in a pattern such as in FIG. 1. For example, in using a machine-implemented process to follow horizons such as at 10a in FIG. 1, at each step the process must find the new horizontal and vertical increments through which it must step to arrive at the next point of interest on horizon 10a. In the deformed (residual) pattern of FIG. 2, the next step for a given horizon is always along the x-coordinate and the step to another horizon is always along the y-coordinate. Such horizontal following can be useful, e.g., in a machine-implemented search for indications of subsurface features such as the apparent indication of a fault in both FIGS. 1 and 2.

Figure 3A:
FIG. 3(a) illustrates an oriented pattern exemplifying a borehole resistivity pattern.
Figure 3B:
FIG. 3(b) illustrates the pattern of FIG. 3(a) having superimposed thereon flow field lines found in accordance with one embodiment of the invention.
Figure 3C:
FIG. 3(c) illustrates the residual pattern derived by mapping the flow field lines of FIG. 3(b) onto horizontal lines (not shown in FIG. 3(c)) and transforming the original pattern accordingly.

An example related to subsurface measurements of the type taken in a borehole traversing subsurface formations is illustrated in FIGS. 3(a)-(d), where FIG. 3(a) illustrates one form of the output of a well logging tool designated by the mark MST, and FIG. 3(c) illustrates the deformed (residual) pattern derived by transforming the pattern of FIG. 3(a) into regular coordinates into which the flow field coordinates estimated for the pattern of FIG. 3(a) have been mapped. The resistivity measurements illustrated in FIG. 3(a) can be used much more conveniently for further processing when deformed in the coordinate system of FIG. 3(c), where they can be followed simply by moving in the vertical direction. Further procesing such as estimating the resistivity at a selected depth in the borehole or in a selected bed, finding the resistivity changes from bed to bed or over a certain borehole depth interval, averaging resistivity over a selected subsurface interval, smoothing resistivity measurements in a selected manner, and other further processing toward the goal of exploring for and exploiting subsurface resources, is much simplified. The lines of the flow field grid which are along the flow direction (but not the lines which are across the flow direction) are illustrated in FIG. 3(b) as superimposed on the original pattern. When the illustrated lines of the flow field are "straightened," and the original pattern is transformed to a corresponding coordinate system of orthogonal coordinates, the resulting residual pattern (illustrated in FIG. 3(c)) becomes substantially independent of the flow field. The depositional and/or tectonic history of the subsurface layers which caused them to dip or curve is substantially removed, and a more efficient further processing of the resulting residual pattern can now be carried out. For example, averaging the resistivity values along horizontal lines can now be done easily by a machine-implemented process, to derive a display such as in FIG. 3(d), which can be physically meaningful in subsurface exploration, while a similarly averaged display of the representation of FIG. 3(a) would be much less meaningful.

The major steps in one example of the invention include starting with an oriented pattern (an "original pattern"), estimating the flow direction locally, deriving a flow field grid by interpolating from the local estimates, and transforming or deforming the original pattern into a regular coordinate system based on the flow field grid, e.g., an orthogonal system along and across the direction of flow in which the grid lines become parallel, straight lines. This deformation produces a residual pattern which is simpler, more regular, and more amenable to further processing. To illustrate the results of these major steps in one example of the invention, reference is made to FIGS. 4(a)-4(d).

Figure 4A:
FIG. 4(a) shows an oriented pattern derived from an image of wood grain.
Figure 4B:
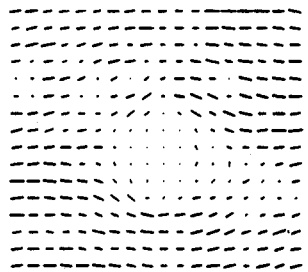
FIG. 4(b) shows local estimates of flow direction and coherence for the pattern of FIG. 4(a)
Figure 4C:
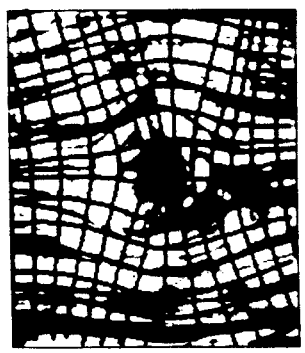
FIG. 4(c) shows a grid of flow field lines along and across the flow field, derived from the local estimates of flow direction and superimposed on the pattern of FIG. 4(a)
Figure 4D:
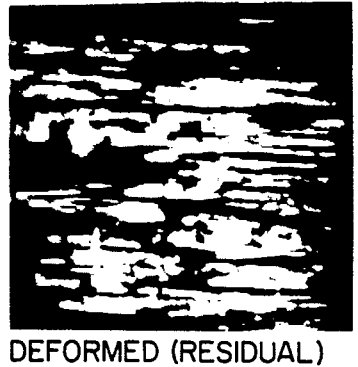
FIG. 4(d) shows a deformed (residual) pattern derived by regularizing the grid of flow field lines, i.e., transforming the original pattern of FIG. 4(a) to orthogonal coordinates onto which the flow field grid lines shown in FIG. 4(c) are mapped.

FIG. 4(a) illustrates an original oriented pattern which is an image of wood grain. FIG. 4(b) illustrates the local estimates of flow directions. Each black needle in FIG. 4(b) has a direction indicative of the local flow direction, and has a length which indicates the local degree of coherence, i.e., how strong the anisotropy is at the pertinent location. FIG. 4(c) illustrates a flow field grid which is obtained in accordance with the invention from the estimates of flow direction illustrated in FIG. 4(b) and is superimposed on the original pattern of FIG. 4(a). FIG. 4(d) illustrates the residual pattern derived in accordance with the invention by mapping the wavy grid lines onto a regular coordinate system which is orthogonal, and is an approximation of what the grain of FIG. 4(a) would have looked like had it not been deformed by the intrusion of the knot.

Figure 8:
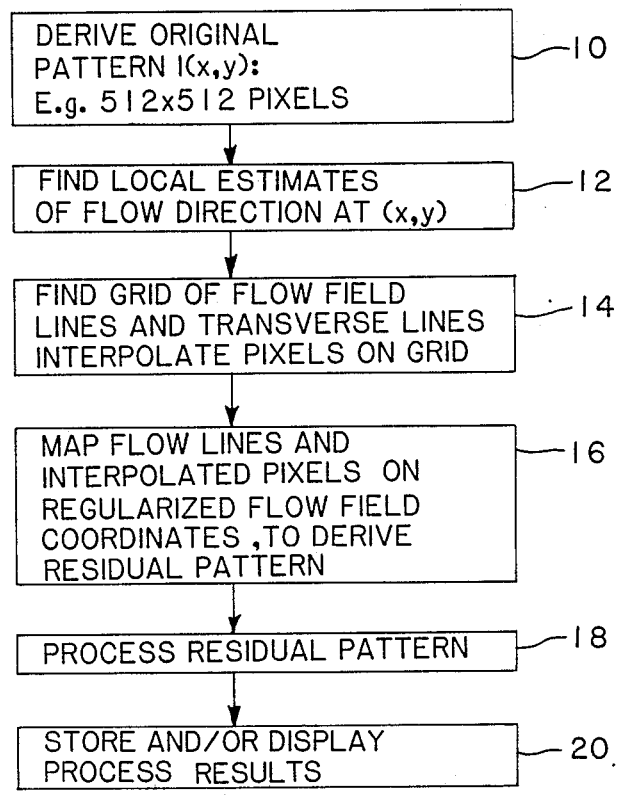
FIG. 8 is a generalized flow chart of an embodiment of the invention.

Referring to the generalized flow chart of FIG. 8, which illustrates a nonlimiting example of a machine-implemented process of carrying out an embodiment of the invention, the first major step, at 10, is to derive an original pattern, for example by quantizing measurements into a rectangular array I(x,y) of 512×512 pixels, each identified by its coordinates (x,y) and each having a respective pixel value represented by, say, 8 or 16 bits. For example, the pattern can be derived by quantizing all or a desired portion of a seismic section, or of borehole resistivity measurements, or of an image. The pixel value can be a measure of the pertinent parameter, such as brightness, resistivity, or acoustic velocity.

The next major step, at 12, is to find local estimates of flow direction in the pattern For patterns created by anisotropic processes such as propagation, accretion or deformation, variations in pixel values in the flow directions tend to be slower than those in the perpendicular direction. Anisotropy in such patterns can be evident in the local power spectrum. The high frequency energy will tend to cluster along the line in the Fourier domain perpendicular to the flow direction. One way to detect this clustering is to use a machine-implemented process to sum the energy in an appropriate region of the power spectrum, and examine through the use of such a process how this sum is affected by rotation centered at a given pixel. This can be done by setting up a process for examining the energy in the output of an appropriate orientation-selective linear filter. The orientation at which the energy is maximal can be expected to be perpendicular to the flow orientation. The selection of an appropriate filter for such a machine-implemented process can involve a number of trade-offs. In the example of a pattern derived from a picture of a surface, very low spatial frequencies are affected more strongly by illumination effects than surface coloration, so they may be inappropriate for measuring textural anisotropy. Very high spatial frequencies are sensitive to noise and aliasing effects, so they too can be inappropriate. A roughly bandpass filtering can be best. The orientation specificity of the filter can also be important. If the filter is too orientation-specific, then a large spatial neighborhood will be required in order to make a reliable measurement of the energy around a given pixel. Conversely, if the filter responds over a wide range of orientations, then it can be difficult to localize the orientation very accurately. A reasonable choice for the frequency response of a filter which has been found useful in a machine-implemented process for carrying out one example of the invention, can be defined by expression (1) below, where r and theta are polar coordinates and sigma 1 and sigma 2 are selected constants. The filter can be thought of as a bandpass filter with bandpass determined by sigma 1 and sigma 2. Ratios of sigman 2 to sigma 1 in the range of about 2 to about 10, have been found to work well. The orientation specificity (or turning curve) of the filter is provided by the cosine dependence on the angle theta:

$$F(r,\theta) = [e^{r^2 \sigma 1^2} - e^{r^2 \sigma 2^2}] 2\pi i r \cos(\theta) \quad (1)$$

The impulse response S(x,y) of the filter can be described by expression (2) below, in which H(x,y) is an isotropic filter which can be described by expression (3) below:

$$S(x,y) = \frac{\partial}{\partial x} H(x,y) \quad (2)$$

$$H(x,y) = [\sigma_1 {-2} e^{r^2/2\sigma 2^2}]$$

If C(x,y) designates the convolution of the image I(x,y) and the isotropic filter H(x,y), and $R_\theta[S]$ denotes a counterclockwise rotation of S by the angle theta, then the convolution of $R_\theta[S]$ and the image I(x,y) characterizes the directional derivative of the convolution of H and I in the theta direction. This directional derivative can be described in terms of the gradient as in expression (4) below, which suggests that a single convolution can suffice for all orientation around a given pixel:

$$R_\theta[S] * I = (\cos\theta, \sin\theta) . \nabla H * I] \quad (4)$$

Since the filter S severely attenuates very low frequencies, the convolution of $R_\theta[S]$ and I can be regarded as zero-mean. Thus the variance $V(\theta)$ in its output can be estimated in accordance with expression (5) below, in which W(x,y) is a local weighting function with unit integral:

$$V(\theta) = W * (R_\theta[S] * I)^2 \quad (5)$$

The Gaussian weighting functions W(x,y) can be used because approximate Gaussian convolutions can be found efficiently. The variance can thus be represented as:

$$V(\theta) = W * [\cos(\theta) C_x + \sin(\theta) C_y]^2 \quad (6)$$

If there is only one axis of anisotropy, then the variance $V(\theta)$ will have two extrema 180° apart corresponding to that axis. If $V_2(\theta) = V(\theta/2)$ then $V_2(\theta)$ will have a single extremum in the interval between 0° and 360°. An efficient way of estimating the position of this extremum is to consider $V_2$ as a distribution and compute its mean. Since the angle $\theta$ is periodic, $V_2$ can be considered as a distribution on the unit circle and the angle phi of greatest variance can be represented by expression 7(a) below which, when evaluated in terms of the weighting function W and the terms $C_x$ and $C_y$, can become expression 7(b) below:

$$\phi = \tan_\alpha^{-1}\beta \tag{7a}$$

$$= \tan^{-1}\left(\frac{\int_0^{2\pi} V_2(\theta)\sin(\theta)d\theta}{\int_0^{2\pi} V_2(\theta)\cos(\theta)d\theta}\right)/2$$

$$= \tan^{-1}\left(\frac{\int_0^{\pi} V(\theta)\sin(2\theta)d\theta}{\int_0^{\pi} V(\theta)\cos(2\theta)d\theta}\right)/2$$

$$\phi = \tan^{-1}\left(\frac{W * 2C_xC_y}{W * (C_x^2 - C_y^2)}\right)/2 \tag{7b}$$

The righthand side of expression (7) above can be regarded as the orientation of a locally weighted sum of the vectors in the form $J(x,y)=(C_x^2-C_y^2, 2C_xC_y)$. These vectors are related in a simple way to the gradient vectors $G(x,y)=(C_x,C_y)$. The magnitude of $J(x,y)$ is the square of the magnitude of $G(x,y)$ and the angle between $J(x,y)$ and the x-axis is twice the angle between $G(x,y)$ and the x-axis, which can be seen from the observation that:

$$(C_x+C_yi)^2 = C_x^2 - C_y^2 + 2C_xC_yi \tag{8}$$

smoothing the gradient vectors $G(x,y)$, which may be the expected next step, in fact should not be done, because such smoothing tends to cancel gradient vectors which point in the opposite directions from a ridge (a flow field line). In contrast, by first rotating the J vectors in accordance with this invention, the vectors which should reinforce in fact do. In the types of oriented patterns which result from many physical phenomena, there are often symmetrical distributions of gradient directions around an axis of anisotropy. In such patterns, if the gradients are added together directly, the cancellation can be so severe that the results can have little relation to the direction of anisotropy. Thus, the difference between first rotating the gradient vectors in accordance with the invention, and adding them up directly, can often be the difference between being able or unable to detect the anisotropy. Because smoothing the image of the oriented pattern first and then fining the gradients is equivalent to finding the gradient vectors and then smoothing, the benefit of first rotating the gradient vectors in accordance with the invention is desirable in each case.

Figure 9:
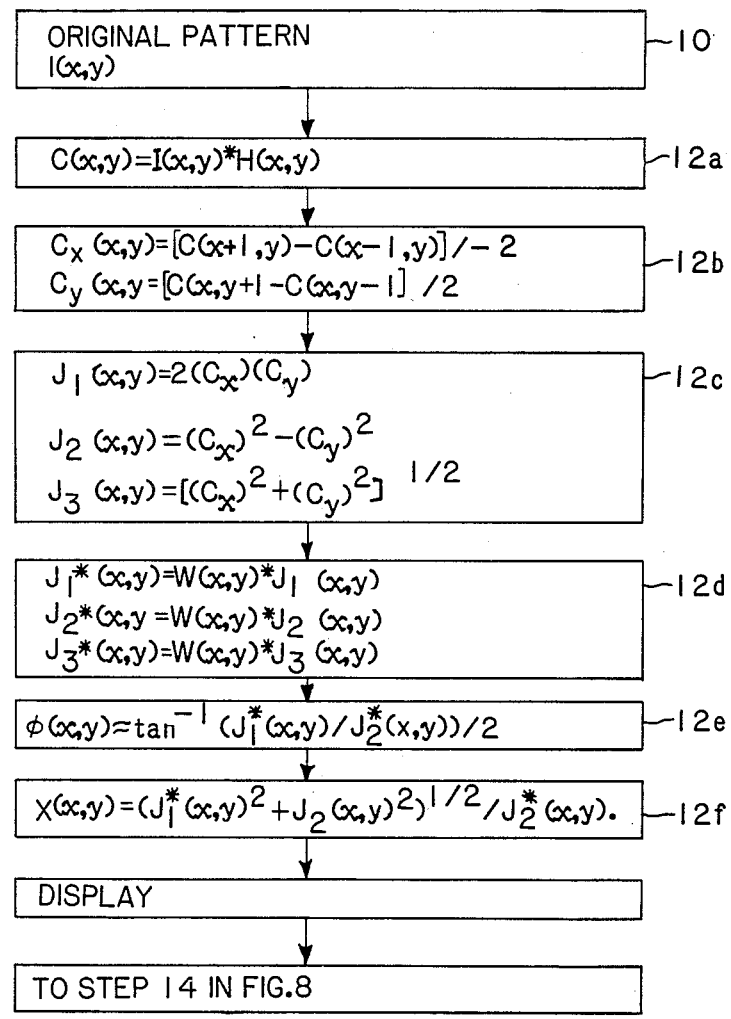
FIG. 9 is a more detailed flow chart of a part of the process of FIG. 8.

In practice, local estimates of flow direction in a pattern can be found in accordance with the invention and the principles discussed above, in the particularly efficient way illustrated in the more detailed flow chart of FIG. 9. In particular, the original pattern derived as discussed above at step 10 of FIG. 8, is convolved at step 12a of FIG. 9 with a quantized version of the filter H(x,y) defined above, to thereby derive the convolved pattern C(x,y), which can still be in the form of a pattern of 512×512 pixels. The filter H can be truncated such that it has a non-zero filter over the entire area of the original pattern. For example, the filter can be used only when its value at a given point in the original image is greater than 0.5% of the maximum value of H anywhere in the original pattern. The vector components $C_x(x,y)$ and $C_y(x,y)$ are found at step 12b as indicated for at least a number of the pixels of the convolved pattern. An efficient way of deriving the vector components $C_x$ and $C_y$ for each respective pixel $C(x,y)$ in the convolved image is to subtract the value of the pixel at $(x-1,y)$ from that at $(x+1,y)$ and divide by 2 to obtain $C_x$, and to subtract the value of the pixel at $(x,y-1)$ from that at $(x,y+1)$ and divide by 2 to obtain $C_y$. This is illustrated in FIG. 4, where the pixel at $(x,y)$ is currently being processed, and the vector components $C_x$ and $C_y$ can be approximated as indicated from the pixel values of the neighboring pixels. The resulting vectors $(C_x(x,y), C_y(x,y))$ are rotated by deriving local measures $$J_1(x,y)=2C_x(x,y)C_y(x,y) \text{ and}$$
$$J_2(x,y)=C_x^2(x,y)-C_y^2(x,y)$$

These local measures $J_1$ and $J_2$ are then convolved at step 12c with a weighting function $W(x,y)$ to obtain the respective local measures $J_1^*(x,y)$ and $J_2^*(x,y)$. A local weighting function $W(x,y)$ which has been found efficacious in practicing this invention can be represented by expression (9) below, in which sigma is in the range of about 2 to about 64 pixels and r is distance from the origin of the (x,y) coordinate system:

$$W(x,y)=[1/[[(2\pi)^{\frac{1}{2}}]\sigma]]e^{-r^2/2\sigma^2} \tag{9}$$

The angle $\phi(x,y)$ of anisotropy can be derived at step 12e in accordance with relationship (10) below:

$$\phi(x,y) \approx \tan^{-1}(J_1^*(x,y)/J_2^*(x,y))/2 \tag{10}$$

If it is desired to find the local coherence $X(x,y)$, a third local measure $J_3(x,y)=[C_x^2(x,y)+C_y^2(x,y)]^{\frac{1}{2}}$ is derived at step 12c, and is convolved at step 12e with the same local weighting function $W(x,y)$ to derive a local measure $J_3^*(x,y)$. The local coherence $X(x,y)$ of the local flow directions can then be found at step 12f in accordance with relationship (11) below:

$$\chi(x,y)=(J_1^*(x,y)^2+J_2^*(x,y)^2)^{\frac{1}{2}}/J_3^*(x,y). \tag{11}$$

Local estimates of flow direction and coherence, found in the manner discussed above, are illustrated in FIG. 4(b) for the wood grain of FIG. 4(a). The flow direction $\phi(x,y)+\pi/2$ is displayed by the orientation of small needles superimposed on the image, and the lengths of the needles are proportional to the local coherence $X(x,y)$. In this particular case the pattern is strongly oriented except near the knot in the middle of the wood grain.

The next major step in the generalized flow chart of FIG. 8 is to trace the grid of flow field lines at step 14, for example the wavy lines illustrated in FIG. 4(c) as superimposed on the original pattern. Next, the flow field lines can be mapped at step 16 onto a regular (e.g., orthogonal) coordinate system to derive a desired residual pattern.

Stated differently, a particularly effective way to remove the effects of changing orientation in accordance with the invention, is to straighten the original pattern by subjecting it to a deformation which maps the grid of typically wavy flow field lines onto straight, parallel lines in a canonical (e.g., horizontal) orientation. Performing this deformation can be thought of as viewing the image in a coordinate system (u,v) with u=u(x,y) and v=v(x,y) which everywhere satisfies the relationship:

$$*\nabla u \cdot (\sin \phi, -\cos \phi) = 0. \quad (12)$$

Expression (12) above does not determine a unique coordinate system. An additional constraint can be imposed by choosing lines of constant v orthogonal to those of constant u, i.e., $\nabla v \cdot (\cos \phi, \sin \phi) = 0$, which has the desirable effect of avoiding the introduction of spurious shear in the deformation. An additional constraint can be desirable because otherwise arbitrary scaling functions for the u and v axes can be specified. It can be desirable to choose scaling functions which avoid the introduction of spurious stretch or dilation. This can usually be done satisfactorily by constructing a fairly local coordinate frame around some point of interest. For this purpose, the point of interest can be taken as the origin and the axis u=0 and v=0 scaled to preserve arc-length along them. The flow field can be thought of as describing the way the pattern is bent, and viewing the image in the flow coordinates can be thought of as viewing a straightened pattern. In the illustration of FIG. 4(c), the flow coordinate grid for the wood grain of FIG. 4(a) was formed by taking steps of fixed length in the direction $(\cos \phi, \sin \phi)$ or $(-\sin \phi, \cos \phi)$ for lines across and along the direction of flow respectively, and using bilinear interpolation on the orientation field. Since the angle o is always between 0° and 180°, one can assume that there are no spurious discontinuities in direction to track smoothly.

In a specific embodiment of carrying out steps 14 and 16 of FIG. 8 to form a new, deformed pattern from an original pattern on the basis of its flow field coordinate system by a machine-implemented process, the process can start at a given pixel of the original pattern, say at the origin of the (x,y) coordinate system. As an alternative, the process can start at any user selected location, which can be in the (x,y) system or in the regular (also called natural) coordinate system (u,v), into which the original pattern is mapped to form the desired residual pattern.

Figure 6:
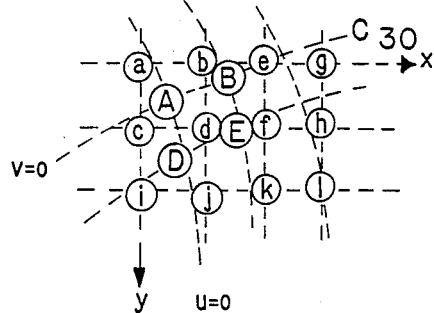
FIG. 6 illustrates a process for interpolating flow lines from nearby local estimates of flow direction, and the value of pixels on the flow lines from nearby pixels of the original pattern.

Suppose the process starts at the origin of the (u,v) system, for example at point A in FIG. 6, at which u=v=0. In that illustration, a-j are pixels of the original pattern for which respective local estimates of flow direction have been found as discussed above. In order to find the location of the next pixel to the right on the flow field line 30, the process interpolates the local direction of the line 30 by bilinear interpolation from the local estimates of flow direction of the nearby pixels a-d of the original pattern. The same is done for moving to the location of pixel B, except that this time the local estimates of flow direction of pixels b-f are used in the interpolation. This goes on until the process reaches the boundary of the original pattern along line 30. Then a similar process is carried out in moving along line 30 to the left of pixel A, each time preserving a selected fixed arc-length in stepping from one pixel location on line 30 the next. Then a selected fixed arc-length step is taken in a transverse direction from pixel A, say to pixel location D, and a similar stepping and interpolation process is carried out to complete a grid of flow field lines such as that illustrated in FIG. 4(c). The values of the pixels at the intersections of the grid lines are found by bilinearly interpolating from the values of the same pixels of the original pattern which were used for interpolating the pertinent flow line direction. Thus, for example, the value of pixel A is interpolated from the values of pixels a-d of the original pattern.

Figure 7:
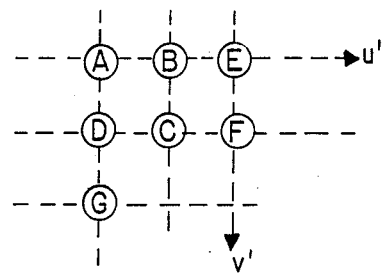
FIG. 7 illustrates mapping the grid of flow field lines onto regular coordinates, and thus deforming the original pattern into a residual pattern in a rectilinear array conforming to orthogonal regular coordinates.

In order to derive a residual pattern, as indicated at step 16 in FIG. 8, the grid lines and pixel values interpolated as discussed above are mapped onto a regular coordinate system, such as the rectangular coordinate system of the array of pixels illustrated at FIG. 7. The result can be as illustrated in FIG. 4(d) for the wood grain pattern, or as illustrated in FIG. 3(c) for the resistivity measurements.

Figure 3D:
FIG. 3(d) illustrates the pattern of FIG. 3(c) transformed by averaging the subsurface resistivity values along horizontal lines in FIG. 3(c) and plotting the averaged values as horizontal lines in FIG. 3(d).

The next step in the generalized flow chart of FIG. 8 is to process the deformed (residual) pattern at step 18. One example of this is illustrated in FIG. 3(d), as discussed above. Other, nonlimiting examples includes using machine-implemented processes to find desired features of subsurface formations by tracing horizons in seismic sections transformed into residual patterns such as illustrated in FIG. 2 in accordance with the invention, and using a machine-implemented process to find significant changes in subsurface resistivities in a residual pattern such as that illustrated in FIG. 3(c).

Finally, at step 20 in FIG. 8 the process results can be stored, displayed and/or further processed. For example, results such as illustrated in FIGS. 2, 3(b)-(d) and 4(b)-(d) can be stored, displayed and/or further processed as discussed above.

Various modifications are possible within the scope of the invention. For example, in finding local estimates of flow direction, a process involving the use of a principle axis which diagonalizes the Hessian matrix can be used instead of the use of gradients as discussed above. Instead of using angle doubling in the same step, a principle component analysis can be used. While the invention has been described as applied to examples of 2-dimensional patterns, its principles apply to 3-dimensional patterns as well, and said principle component analysis can be used to advantage in the case of 3-dimensional patterns. If the original pattern is concentrically organized, polar coordinates rather that orthogonal ones can be used for the residual pattern. Pyramid techniques can be used in the convolutions discussed above to speed up the process.

One exemplary embodiment of the invention can be machine-implemented process utilizing a computer system of suitable configuration and size programmed to carry out the steps discussed above and illustrated in the drawings. In the alternative, the invention can be implemented in whole or in part in a firm-wired, or a hard-wired system carrying out the same steps.

In summary, one important aspect of the invention is to find local estimates of flow direction in the pattern, such as those illustrated in FIG. 4b and to use those local estimates to derive a grid of flow lines, such as those running mainly from left to right in FIG. 4c and/or transverse flow lines, such as those running mainly up and down in FIG. 4c. As discussed above, the invention contributes a particularly efficient technique for finding local estimates flow direction and, if desired, of local coherence, and using them to find the desired partial or full grid of flow field lines. Another important aspect of the invention pertains to transforming an original pattern, such as the original pattern in FIG. 3a or that in FIG. 4a into a residual pattern, such as the residual pattern in FIG. 3c or FIG. 4d which are in a flow field coordinate system, more precisely a regularized flow field coordinate system, in which the parameter of interest in the pattern can be traced along regular lines, e.g., the x- and/or y-coordinates of an orthogonal system or the r and theta coordinates of a polar system. Yet another important aspect of the invention concerns processing the residual pattern by utilizing one or more of the regular coordinates in which it is represented, such as, for example, in tracing the seismic horizons of the residual pattern illustrated in FIG. 2 along the horizontal direction of the x-coordinate. Other important aspects of the invention have been discussed expressly above, and yet others will be apparent to those skilled in the art from the specification, claims and drawings of this application.

We claim:

1. A method of processing an oriented pattern comprising the steps of:
   finding local estimates of flow direction in the pattern;
   deriving a flow field based on said local estimates of flow direction; and
   extracting useful features of the pattern by utilizing said flow field.

2. A method as in claim 1 in which the extracting step comprises using said flow field to extract a residual pattern from said oriented pattern and wherein the flow field comprises lines conforming to said local estimates, and said lines are mapped on lines conforming to a regular coordinate in the residual pattern.

3. A method as in claim 1 in which the finding step comprises locally estimating the direction of at least one of the greatest and the least change of a selected parameter of the pattern at each of a number of selected locations in the pattern.

4. A method as in claim 3 in which the deriving step comprises deriving a grid comprising (i) flow lines which are along respective directions locally conforming to the local estimates of direction of flow and (ii) transverse lines which are along respective directions locally conforming to directions transverse to said local estimates of direction, wherein said lines intersect each other at points separated along the respective lines by respective constant arc-lengths.

5. A method as in claim 4 in which the extracting step comprises deforming the pattern by mapping said flow lines and transverse lines onto selected regular coordinates.

6. A method as in claim 5 in which the extracting step further comprises extracting selected features of the deformed image by using at least one of said regular coordinates.

7. A method as in claim 1 in which the deriving step comprises deriving a grid comprising (i) flow lines which are along respective directions locally conforming to the local estimates of direction of flow and (ii) transverse lines which are along respective directions locally conforming to directions transverse to said local estimates of direction, wherein said lines intersect each other at points separated along the respective lines by respective constant arc-lengths.

8. A method as in claim 7 in which the extracting step comprises deforming the pattern by mapping said flow lines and transverse lines onto selected regular coordinates.

9. A method as in claim 8 in which the extracting step further comprises extracting selected features of the deformed image by using at least one of said regular coordinates.

10. A method as in claim 1 in which the extracting step comprises deforming the pattern by mapping said flow field onto a coordinate system comprising regular coordinates.

11. A method as in claim 10 in which the extracting step further comprises extracting selected features of the deformed image by using at least one of said regular coordinates.

12. A method as in claim 1 in which the finding step includes filtering the pattern with an orientation-selective linear filter.

13. A method as in claim 12 in which said filtering comprises using a bandpass filter.

14. A method as in claim 13 in which the filter suppresses low and high spatial frequency characteristics of the pattern.

15. A method as in claim 14 in which the filter has a frequency response F which is consistent with the following relationship, in which r is the distance from the origin of the coordinate system, theta is angle, and sigma 1 and sigma 2 are constants selected such that the ratio of sigma 2 to sigma 1 is in the range of about 2 to about 10:

$$F(r,\theta) = [e^{r^2 \sigma 1^2} - e^{r^2 \sigma 2^2}] 2\pi i r \cos(\theta).$$

16. A method as in claim 1 in which the finding step comprises locally estimating the gradient vector of a selected parameter of the pattern of each of a number of selected locations in the pattern, doubling the local gradient vector angles to map local directions differing by about 180° into a single local direction, summing the resulting gradient vectors over local weighted neighborhoods in the pattern, halving the angles of the resulting summed vectors to estimate the local direction of greatest variance of the selected parameter, and rotating said direction by about 90° to estimate the local direction of least variance and thus estimate the local flow direction.

17. A method as in claim 16 in which the deriving step comprises starting at a selected location in the pattern and finding grid lines by taking steps of respective fixed arc-length along flow lines which are locally along the local flow directions and along transverse lines which are locally across the local flow directions.

18. A method as in claim 17 in which the step of finding grid lines comprises using bilinear interpolation from said local flow directions.

19. A method as in claim 18 in which the extracting step comprises mapping said grid lines onto a regular coordinate system to derive a deformed pattern.

20. A method as in claim 19 in which said mapping comprises using bilinear interpolation from the values of one or more selected parameters of respective elements of the original pattern to derive interpolated values for elements of the deformed pattern.

21. A method as in claim 19 in which said regular coordinates are orthogonal coordinates.

22. A method as in claim 1 in which the finding step comprises convolving the pattern I(x,y) with an isotropic bandpass filter H(x,y) to produce a convolved pattern C(x,y).

23. A method as in claim 22 in which the filter is applied to each of a number of selected elements of the pattern which are identified by their respective coordinates (x,y), and the filter is characterized by the following expression for H(x,y), in which r is distance and sigma 2 and sigma 1 are selected constants the ratio of which is in the range of about 2 to about 10:

$$H(x,y) = [\sigma_1^{-2} e^{r^2/\sigma_1^2} - \sigma_2^{-2} e^{r^2/2\sigma_2^2}].$$

24. A method as in claim 23 in which the convolved pattern C(x,Y) is locally differentiated by finite differences to find the local change in a selected parameter of the pattern in the x-direction ($C_x$) and in the y-direction ($C_y$) at each of a number or selected locations (x,y) in the pattern, deriving local measures $J_1(x,y) = 2(C_x)(C_y)$ and $J_2(x,y) = (C_x)^2 - (C_y)^2$, convolving each of the local measures with a local weighting function W(x,y) to derive respective local measures $J_1^*(x,y)$ and $J_2^*(x,y)$, and deriving the local angle phi of greatest change of a selected parameter of the pattern in accordance with the following approximate relationship:

$$\phi(x,y) \approx \tan^{-1}(J_1^*(x,y)/J_2^*(x,y))/2.$$

25. A method as in claim 24 in which the weighting function conforms to the following relationship, in which r is distance and sigma is a constant selected to correspond to the distance between about 2 and about 64 adjacent elements of the pattern:

$$W(x,y) = [1/[[(2\pi)^{\frac{1}{2}}]\sigma]] e^{-r^2/2\sigma^2}.$$

26. A method as in claim 25 including deriving local measures $J_3(x,y) = [C_L^3(x,y) + C_r^2(x,y)]^{\frac{1}{2}}$ and convolving them with a local weighting function W(x,y) to derive local measures $J_3^*(x,y)$ and finding the local coherence X(x,y) of the local flow directions in accordance with the relationship:

$$X(x,y) = (J_1^*(i\,x,y)^2 + J_2^*(x,y)^2)^{\frac{1}{2}}/J_3^*(x,y).$$

27. A method as in claim 26 including the step of displaying the local flow directions and the local flow coherence.

28. A method as in claim 25 in which the deriving step comprises starting at a selected location in the pattern and finding grid lines by taking steps of respective fixed arc-length along flow lines which are locally along the local flow directions and along transverse lines which are locally across the local flow directions.

29. A method as in claim 28 in which the extracting step comprises mapping said grid lines onto a regular coordinate system to derive a deformed pattern.

30. A method as in claim 29 in which the extracting step comprises using said regular coordinates to estimate changes in a selected parameter of the deformed pattern along at least one of said regular coordinates.

31. A method as in claim 1 including the step of deriving measurement signals related to one or more selected parameters of selected subsurface formations, and deriving said oriented pattern from said measurement signals.

32. A process as in claim 31 in which the measurement signals are derived from a borehole traversing selected subsurface formations.

33. A method of processing an oriented pattern comprising the step of:
 processing the pattern to estimate its flow field;
 using the flow field to represent the pattern in a regular coordinate system based on but different from that of the flow field; and
 further processing the pattern in said regular coordinate system to derive desired features of the pattern.

34. A method as in claim 33 including the step of displaying the pattern in said regular coordinates.

35. A method as in claim 34 in which said regular coordinates are orthogonal coordinates.

36. A method as in claim 35 in which said regular coordinates are polar coordinates.

37. A method of processing an original oriented pattern comprising:
 processing the original pattern to transform it into a residual pattern which is in a regular coordinate system conforming to the flow field of the original pattern; and
 processing the residual pattern by using at least one coordinate of said regular coordinate system to extract desired features of the pattern.

38. A method of processing an oriented pattern comprising:
 finding local estimates of flow direction in the pattern; and
 using said local estimates to extract an estimate of a residual pattern corresponding to the original pattern but substantially independent of estimated effects of a flow characterized by said local estimates of flow direction.

* * * * *